W. M. SCHWARTZ.
ROTARY DRIER.
APPLICATION FILED JAN. 22, 1920.

1,345,260.

Patented June 29, 1920.
2 SHEETS—SHEET 1.

Inventor—
Walter M. Schwartz
by his Attorneys

W. M. SCHWARTZ.
ROTARY DRIER.
APPLICATION FILED JAN. 22, 1920.
1,345,260.
Patented June 29, 1920.
2 SHEETS—SHEET 2.
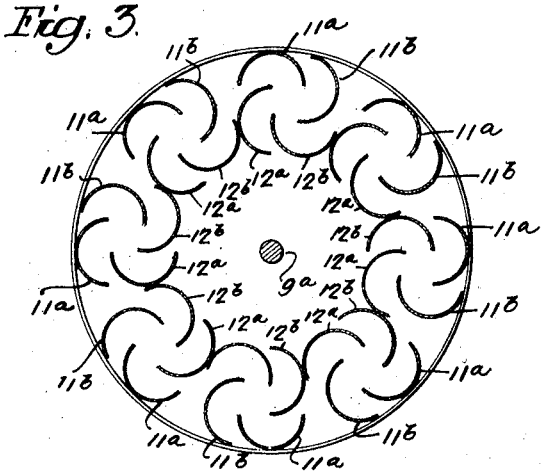
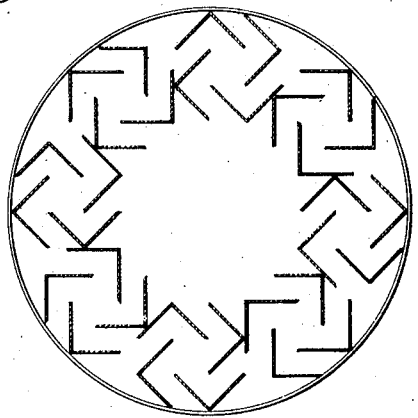
Inventor—
Walter M. Schwartz
by his Attorneys.—

UNITED STATES PATENT OFFICE.

WALTER M. SCHWARTZ, OF PHILADELPHIA, PENNSYLVANIA, ASSIGNOR TO THE PHILADELPHIA TEXTILE MACHINERY COMPANY, OF PHILADELPHIA, PENNSYLVANIA, A CORPORATION OF PENNSYLVANIA.

ROTARY DRIER.

1,345,260.  Specification of Letters Patent.  Patented June 29, 1920.

Application filed January 22, 1920. Serial No. 353,241.

*To all whom it may concern:*

Be it known that I, WALTER M. SCHWARTZ, a citizen of the United States, residing in Philadelphia, Pennsylvania, have invented certain Improvements in Rotary Driers, of which the following is a specification.

My invention relates to certain improvements in driers in which hot air is circulated through the material in a drying chamber.

My invention also relates to certain improvements in a drying apparatus for which application for Letters Patent has been filed by A. O. Hurxthal for improvements in driers, on the 1st day of December, 1919, under Serial No. 341,610 and assigned to The Philadelphia Textile Machinery Company.

The object of my present invention is to provide a drier in which there are two rows of pocketed blades, so that the material, as the cylinder rotates, is kept in motion by passing from one set of blades to the other.

In the accompanying drawings:

Figs. 3 and 4 are sectional views illustrating modifications of the invention.

Figure 1:
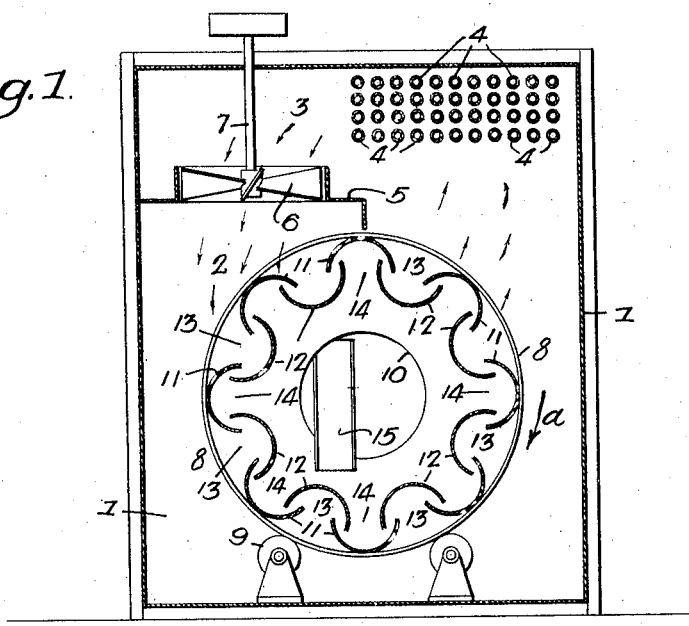
Figure 1 is a transverse sectional view, showing my improved drying apparatus.

1 is a casing having two compartments in the present instance. 2 is the drying compartment and 3 is the heating compartment, in which are coils of pipe 4, or other heating means. 5 is a transverse partition in which are openings for fans 6 mounted on vertical shafts 7, driven in any suitable manner, so as to circulate air, through the two chambers 2 and 3. The fans however may be located in any suitable position. 8 is a cylinder mounted on rollers 9. One or both of these rollers may be driven so as to impart a rotary motion to the cylinder 8, or the cylinder may be mounted on a central shaft $9^a$, Fig. 3, which is adapted to bearings in the frame of the drier. The cylinder consists of two ends 10 and two series of blades 11 and 12, which are attached to the ends 10, in any suitable manner. Each blade 11, as shown in Fig. 1, is curved with the ends projecting toward the center of rotation so as to form pockets. The blades are spaced apart so as to form channels 13 for the passage of air, as it circulates in the drying chamber. The blades 12 are curved, similar to the blades 11, but the ends extend from the center or rotation and into the pockets of the blades 11. These blades are spaced apart, as at 14, for the passage of air so that the air, as it circulates, in the present instance, passes through the spaces 13 into the pocket of the blade 12, and then into the pocket of the blade 11 and out through the space 14 into the center of the cylinder. Then across the cylinder and out through the space between the blades at the opposite side thereof.

Figure 2:
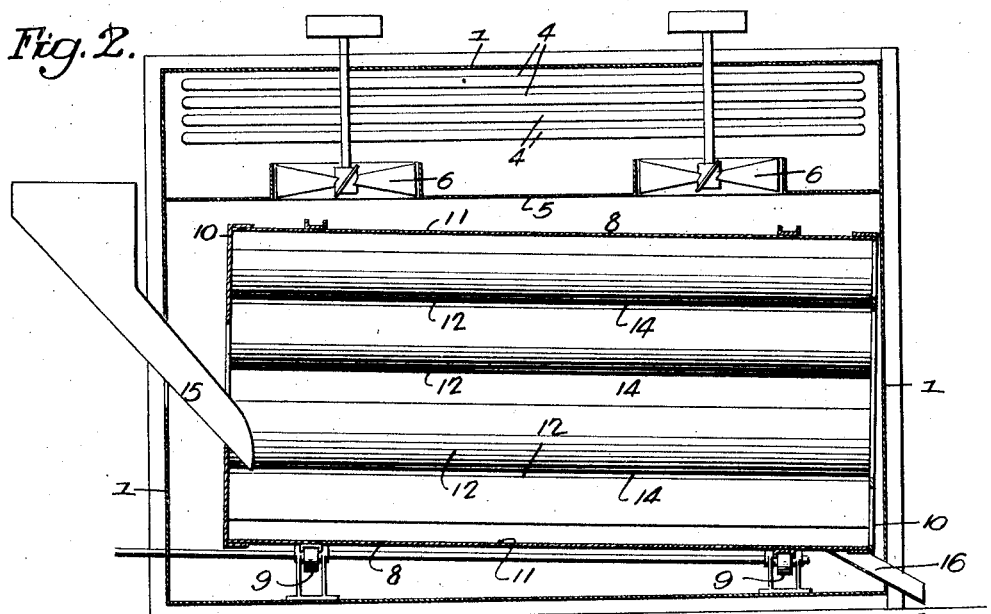
Fig. 2 is a longitudinal sectional view, with the cylinder in elevation.

The material, in the present instance, is fed through a spout 15 at one end of the cylinder, the end being open to receive the spout. The material is discharged through a spout 16 at the opposite end, as shown in Fig. 2. The material is discharged from the spout through one of the spaces 14 between the blades 12 into the pocket of one of the blades 11 and is carried upward by said blade, as the cylinder rotates in the direction of its arrow *a*. As the blades pass the center, the material commences to flow by gravity from the blade 11 into one of the blades 12 and before the blade 11, carrying the material, reaches the upper end of the cylinder, it has discharged its contents, the material in the meantime flowing from the blade 12 to another blade 11, so that the material is kept in motion at all times while it is moved forward throughout the length of the cylinder. The pockets of the blades are open at the discharge end so that when the material reaches this end it flows into and through the chute 16.

In the above construction, the air, as it passes through the cylinder, must travel in a circuitous path so that the material is subjected to the action of the air as it flows from the outer series of blades to the inner series and from the inner to the outer series.

In Fig. 3, I have illustrated a modification of the invention, in which there are two sets of blades on the outer row $11^a$ and $11^b$ and two series of blades on the inner row $12^a$ and $12^b$. This arrangement allows spaces between the blades for the circulation of the air and the material flows from one outer blade to the other outer blade and then from the latter blade to one of the inner blades, which carries it over the top of the cylinder and discharges the material into the other inner blade at the opposite side of the cylinder, which again returns it to the first mentioned outer blade so that the material is carried continuously around the cylinder.

In Figs. 1 and 3, I have shown the blades curved, while in Fig. 4, I have illustrated a modification in which the sides of the blades are at right angles to each other, being arranged in substantially the same manner as the blades in Fig. 3, the material being also carried around the cylinder.

I claim:—

1. The combination in a drier, of a drying chamber; means for circulating air therein; and a rotating cylinder having two series of blades, one within the other, the blades of each series being spaced apart to form channels for the passage of air, the blades being arranged so that, as the cylinder rotates, the material will flow from the blades of one series to the blades of the other series.

2. The combination in a drier, of a drying chamber; means for circulating air therein; a cylinder having ends and two series of longitudinal blades, one series being located within the other; means for supplying the cylinder with material to be dried, the blades of the outer series having their ends projecting inwardly and the blades of the inner series having their blades projecting outwardly and into the pockets of the outer series so that, as the cylinder is rotated, the material will flow from the blades of one set to those of the other set, as the air circulates in the spaces between the blades.

3. The combination in a drier, of a drying chamber; means for circulating warm air in said chamber; a cylinder having ends and two series of longitudinal blades secured to the ends; means for supporting and rotating said cylinder, one series of blades being within the other series, the blades being semi-circular in cross section, the blades of the outer series being spaced apart to form air channels and having their ends extending toward the center of rotation, the other blades being semi-circular in cross section and having their ends projecting outward and spaced apart to form air channels, the ends of one series of blades extending into the pockets of the other series, so that the air passing transversely through the cylinder will travel in a circuitous path and through the material as it falls from one blade to the other.

WALTER M. SCHWARTZ.